(12) United States Patent
Coupin

(10) Patent No.: US 8,815,991 B2
(45) Date of Patent: Aug. 26, 2014

(54) COMPOSITION OF POLYMERS DERIVED FROM RENEWABLE RESOURCES

(75) Inventor: Thierry Coupin, Carnières (BE)

(73) Assignee: Futerro S.A., Escanaffles (BE)

( * ) Notice: Subject to any disclaimer, the term of this patent is extended or adjusted under 35 U.S.C. 154(b) by 0 days.

(21) Appl. No.: 13/640,524

(22) PCT Filed: Apr. 12, 2011

(86) PCT No.: PCT/EP2011/001821
§ 371 (c)(1),
(2), (4) Date: Dec. 18, 2012

(87) PCT Pub. No.: WO2011/128064
PCT Pub. Date: Oct. 20, 2011

(65) Prior Publication Data
US 2013/0217818 A1    Aug. 22, 2013

(30) Foreign Application Priority Data

Apr. 13, 2010 (BE) .................. 2010/0239

(51) Int. Cl.
*C08K 5/00* (2006.01)
*C07C 67/08* (2006.01)
*C08F 24/00* (2006.01)
*C08F 118/02* (2006.01)
*C08F 16/12* (2006.01)

(52) U.S. Cl.
USPC ........... 524/310; 524/308; 526/319; 526/332; 526/266

(58) Field of Classification Search
USPC .................. 524/310, 308; 526/319, 332, 266
See application file for complete search history.

(56) References Cited

U.S. PATENT DOCUMENTS

| | | | |
|---|---|---|---|
| 7,268,190 B2 * | 9/2007 | Ohme et al. | 525/400 |
| 7,550,541 B2 * | 6/2009 | Ohme et al. | 525/400 |
| 2005/0154114 A1 | 7/2005 | Hale | |
| 2008/0281018 A1 | 11/2008 | Seeliger et al. | |
| 2010/0016538 A1 | 1/2010 | Dubois et al. | |
| 2010/0113734 A1 | 5/2010 | Dubois et al. | |
| 2010/0160505 A1 | 6/2010 | Kumazawa et al. | |

FOREIGN PATENT DOCUMENTS

| | | |
|---|---|---|
| CN | 101386703 A | 3/2009 |
| CN | 101993584 A | 3/2011 |

OTHER PUBLICATIONS

Office Action issued in Chinese Patent Application No. 201180028920.9, dated Feb. 21, 2013 and English translation thereof (14 pages).

* cited by examiner

*Primary Examiner* — William Cheung

(57) ABSTRACT

The present invention relates to a polymer composition comprising polylactide and, based on the weight of this polymer, from 17 to 25 wt % of a chain modifier, from 30 to 55 wt % of an elastomeric polymer and from 20 to 45 wt % of a plasticizer. The invention also relates to the method of preparing said composition as well as to the method of manufacturing an article starting from said composition and the article per se.

12 Claims, No Drawings

COMPOSITION OF POLYMERS DERIVED FROM RENEWABLE RESOURCES

CROSS-REFERENCE TO RELATED APPLICATIONS

This application claims the benefit of PCT/EP2011/001821, filed Apr. 12, 2011, which claims priority from BE 2010/0239, filed Apr. 13, 2010.

TECHNICAL FIELD OF THE INVENTION

The present invention relates to a polymer composition obtained from renewable resources, in particular polylactide (PLA), as well as to objects obtained by the usual methods of plastics processing starting from this composition.

In particular, the polymer composition of the invention comprises a preferably phthalate-free plasticizer, as well as additives for improving its impact toughness; more particularly, the present invention relates to this type of polymer composition obtained from renewable resources having properties of elongation at break above 200% as well as improved properties of heat resistance.

The present invention also relates to objects having a set of improved mechanical and thermal properties, obtained starting from this composition by usual methods of plastics processing, notably by moulding, by thermoforming or any other processing technique.

TECHNOLOGICAL BACKGROUND

Synthetic polymers based on compounds from the petrochemical industry had a considerable industrial impact in the middle of the 20th century. Despite the numerous advantages of these materials, two drawbacks still remain to be solved: use of renewable resources for their production, and recycling of them after use. Taking into account their intrinsic properties, polymers obtained from renewable resources have therefore become an important alternative and there have been many advances both from the standpoint of synthesis and of processing of these materials. They are used, moreover, for a large number of applications such as moulding, packaging or textiles.

Among the various polymers obtained from renewable resources, polylactic acid or polylactide (PLA) is one of the most commonly used. Taking into account the use of renewable resources, polymers such as PLA have received particular attention, notably for partly replacing certain articles and mouldings in polyvinyl chloride (PVC), which despite their good balance of properties have certain shortcomings from the standpoint of wettability or heat resistance.

However, these polymers obtained from renewable resources must also be used for moulding or injection moulding, to make objects that must meet certain criteria from the standpoint of their mechanical and physical properties. It therefore appears necessary to develop compositions comprising these polymers and containing at least one plasticizer and other additives in order to satisfy the required properties, such as flexibility, hardness, wettability, impact toughness or elongation. Moreover, and depending on policies regarding environmental protection, it is desirable for the plasticizer used to be phthalate-free.

It also appears desirable that the polymer composition should contain compounds for improving impact toughness. In this context, it was often found that the use of phthalate-free plasticizer altered the glass transition temperature (Tg) of the composition, which consequently affected the impact toughness.

Generally, it goes without saying that we wish to have a favourable effect on the environment and therefore that the aim is to replace PVC objects with objects manufactured from polymers obtained from renewable resources.

Moreover, it has become apparent that even compositions based on PVC have certain drawbacks such as insufficient elongation at break, or inadequate heat resistance or wettability, these last two properties being manifested, for the resultant objects, by the development of cracks or difficulty in being painted.

Moreover, at present, for certain mouldings, for example figurines, the polymer compositions from which they are produced should meet at least three criteria, namely significantly improved properties of elongation at break, because they must be able to withstand deformation without damage, which can be achieved if the elongation at break is above 200%, a Shore hardness A between 60 and 95 because they must remain stable, and wettability expressed by a surface tension above 34 dyn/cm so that they can easily be painted. Now, at present, the existing polymer compositions from which moulded objects or injection mouldings are produced do not provide all of these properties.

Moreover, it is highly desirable that polymer compositions intended for preparation of moulded objects, for example figurines, in addition should have a good balance of other mechanical and physical properties, namely as indicated below:

Shore hardness D<50;
heat resistance expressed by the storage modulus at 54° C.>20 MPa;
good impact toughness expressed by a ductility index >30%;
total fracture energy >8 Joule;
deflection >18 mm and
good temperature resistance without crazing.

There is therefore a need to develop polymer compositions obtained from renewable resources meeting all these criteria simultaneously and allowing objects to be manufactured by the usual techniques of plastics processing.

SUMMARY OF THE INVENTION

The present invention provides a composition that meets the required criteria of elongation, Shore hardness A and wettability that are desired while maintaining a good balance of other mechanical and physical properties as defined above and which makes it possible to obtain objects, by usual methods of plastics processing, that have the required mechanical and physical properties; said composition comprising polylactide, a chain modifier, an elastomeric compound for improving ductility and a plasticizer, which is preferably phthalate-free.

The applicant found that the compositions of the invention not only have improved main properties such as minimum elongation at break, level of Shore hardness A and wettability, expressed as surface tension, but also all the other desirable mechanical and physical properties.

One aim of the invention is to provide a polymer composition obtained from renewable resources that has, simultaneously:

a property of elongation at break >200% measured by ASTM method D-638,
Shore hardness A between 60 and 95 measured by ASTM method D-2240 and wettability, expressed as surface tension >34 dyn/cm measured by ASTM method D-2578.

Another aim of the invention is that the composition should have properties of heat resistance, expressed as storage modulus at 54° C.>20 MPa measured by ASTM method D-4062.

Another aim of the invention is that the composition should have mechanical strength expressed as Shore hardness D<50 measured by ASTM D-2240.

Another aim of the invention is that the composition should have a ductility index >30% measured by ASTM D-3763.

Another aim of the invention is that the composition should have a total fracture index above 8 Joule measured by ASTM D-3763.

Another object of the invention is that the compositions should have deflection above 18 mm measured by ASTM D-3763.

Another aim of the present invention is to provide articles having a good balance of starting properties of said composition by the usual methods of plastics processing such as thermoforming, extrusion, injection or compression moulding.

Another aim of the present invention is to provide a composition that gives very little detachment of material during removal from the mould.

The applicant found, unexpectedly, that the composition of the invention is able to provide a balance of good properties of ductility, hardness and elongation at break (>200%), as well as good surface properties (smoothness) and mould release properties.

Furthermore, the applicant also found, unexpectedly, that said composition displays good properties of wettability, thus allowing objects obtained with this composition to be painted easily.

DETAILED DESCRIPTION OF THE INVENTION

The present invention provides a polymer composition for making moulded objects or injection mouldings comprising polylactide and, based on the weight of said polymer, from 17 to 25 wt % of a chain modifier, from 30 to 55 wt % of an elastomeric polymer and from 20 to 45 wt % of a plasticizer, which is preferably phthalate-free.

The composition of the present invention therefore comprises polylactide and a set of additives necessarily comprising a plasticizer, a chain-modifying additive and an elastomeric polymer of renewable origin, as additive for improving ductility.

The present invention relates to a polymer composition comprising:
 a) polylactide, and based on the weight of this polymer,
 b) from 17 to 25 wt % of a chain modifier selected from copolymers and terpolymers comprising ethylene or styrene and an unsaturated monomer bearing at least one epoxide or carboxylic acid or carboxylic acid anhydride fraction and optionally a (meth)acrylate fraction,
 c) from 30 to 55 wt % of an elastomeric polymer selected from biodegradable polyesters, aliphatic copolyesters, aromatic copolyesters and mixtures thereof and
 d) from 20 to 45 wt % of a plasticizer.

The polylactide used in the composition of the invention has a number-average molecular weight, expressed in polystyrene (PS) equivalent, generally between 50 000 and 250 000.

In the present invention, polylactide means poly-L-lactide (PL-LA), poly-D-lactide (PD-LA), copolymers based on lactides as well as stereocomplexes of PLA such as those described in patent applications WO2008/037773 and WO2008/037772. Preferably, the polylactide is poly-L-lactide.

The PLA can be used in conjunction with usual stabilizers in order to avoid degradations of coloration or even transesterification.

The applicant found, unexpectedly, that by adding a plasticizer, preferably phthalate-free, and a chain modifier to the elastomeric polymer for improving the ductility, a composition having the required properties was obtained.

In the present invention, chain modifier means all copolymers or terpolymers as described below that will be grafted onto the PLA chain.

The chain modifier is generally selected from copolymers and terpolymers comprising ethylene or styrene and an unsaturated monomer bearing at least one epoxide or carboxylic acid or carboxylic acid anhydride fraction and optionally a (meth)acrylate fraction. In the present invention, the term fraction is a synonym of group.

Preferably, the chain modifier is selected from copolymers and terpolymers comprising ethylene or styrene and an unsaturated monomer bearing a carboxylic acid anhydride fraction or bearing an epoxide fraction and a (meth)acrylate fraction.

More preferably, the chain modifier is selected from copolymers of ethylene or of styrene and glycidyl (meth)acrylate or maleic anhydride and terpolymers of ethylene or of styrene, of alkyl (meth)acrylate and of glycidyl (meth)acrylate or of maleic anhydride. Among the alkyl (meth)acrylates, we may mention those whose alkyls have between 1 and 10 carbon atoms, for example methyl methacrylate, methyl acrylate, ethyl methacrylate, ethyl acrylate, n-butyl acrylate, isobutyl acrylate, 2-ethylhexyl acrylate, n-octyl acrylate.

The copolymers of ethylene or of styrene and of glycidyl (meth)acrylate or of maleic anhydride can contain from 50 to 99 wt % of ethylene or of styrene and from 1 to 50 wt % of glycidyl (meth)acrylate or of maleic anhydride, preferably from 90 to 98 wt % of ethylene or of styrene and from 2 to 10 wt % of glycidyl (meth)acrylate or of maleic anhydride, the total of the percentages making 100%.

The terpolymers of ethylene or of styrene, of alkyl (meth)acrylate and of glycidyl (meth)acrylate or of maleic anhydride can contain from 50 to 97 wt % of ethylene or of styrene, from 1 to 50 wt % of alkyl (meth)acrylate and from 0.2 to 10 wt % of glycidyl (meth)acrylate or of maleic anhydride, the total of the percentages making 100%. Preferably the terpolymers contain from 55 to 95 wt % of ethylene or of styrene, from 2 to 35 wt % of alkyl (meth)acrylate and from 0.3 to 8 wt % of glycidyl (meth)acrylate or of maleic anhydride.

Even more preferably, the chain modifier is selected from the copolymers of ethylene and of glycidyl methacrylate and the terpolymers of ethylene or of styrene, of alkyl acrylate and of glycidyl (meth)acrylate or of maleic anhydride.

Among the latter, it is possible to use the copolymer of ethylene and of glycidyl methacrylate sold under the name Lotader®AX 8840 by Arkema France, the terpolymer of ethylene, of ethyl acrylate and of maleic anhydride sold under the name Lotader®4700 by Arkema France as well as the terpolymer of styrene, of alkyl acrylate and of glycidyl methacrylate sold under the name Joncryl® by the company BASF.

The terpolymers of ethylene or of styrene, of alkyl acrylate and of glycidyl methacrylate are truly preferred. In particular it is preferable to use a terpolymer of ethylene, of methyl acrylate and of glycidyl methacrylate. An example of such a terpolymer is Lotader®AX8900 sold by Arkema France comprising 68 wt % of ethylene, 24 wt % of methyl acrylate and 8 wt % of glycidyl methacrylate. The chain modifier is generally used in amounts between 17 and 25 wt % based on the weight of the polylactide.

A polymer of the elastomeric type, of renewable origin and/or biodegradable, is used as the compound for improving ductility. In the present invention, elastomeric polymer means a polymer having elastic properties which withstands large deformations while returning to its original state when the stress is removed. The term renewable applies to a natural resource, the stock of which can be restored in a short period on the human scale. The term biodegradable applies to an organic material if it is degraded under the action of microorganisms in the presence of oxygen to carbon dioxide, water and mineral salts and, optionally, to by-products (residues, fresh biomass) or if it is degraded in the absence of oxygen to carbon dioxide, methane, mineral salts and creation of fresh biomass.

The polymers of the elastomeric type used in the present invention can be selected from biopolyesters (biodegradable polyesters). As biopolyesters, we may mention polyhydroxyalkanoates, preferably copolymers of polyhydroxyalkanoates, for example poly(hydroxybutyrate-co-3-hydroxyvalerate) (PHBV), poly(hydroxybutyrate-co-3-hydroxyhexanoate) or poly(hydroxyoctanoate-co-3-hydroxydecanoate). The polymers of the elastomeric type used in the present invention can also be selected from aliphatic or aromatic copolyesters and mixtures thereof such as poly(butylene adipate-co-terephthalate) and poly(butylene succinate-co-adipate). As commercially available products corresponding to this definition that can be used in the composition of the invention, we may mention Ecoflex®, a product sold by BASF or NP EL 01 (experimental grade), supplied by NaturePlast, or Apinat® sold by the company Api. It is generally used in amounts between 20 and 55 wt % based on the weight of the PLA.

As plasticizer, preferably a phthalate-free plasticizer is used in the interests of environmental protection, it being understood that other plasticizers may also be suitable.

Plasticizer means an organic chemical which, when added to the composition of the invention, increases the flexibility of the latter and therefore its capacity for being moulded. As phthalate-free plasticizer that can be used, reference may be made to those mentioned in "Van Nostrand's Encyclopedia of Chemistry", Fifth Edition, edited by Glenn D. Considine, page 1316. Among these, we may mention for example phosphates such as tricresyl phosphate, esters of aliphatic dibasic acids such as adipates, sebacates and azelates, esters of fatty acids. Among the phthalate-free plasticizers, we may notably use those from the family of citrates, in particular citrate esters (esters of citric acid) such as tert-butylene citrate or tributyl citrate (TBC, CAS number: 77-94-1) or butyrate esters (esters of butyric acid) such as triethylene glycol di-2-ethyl hexyl butyrate supplied by Proviron under the name L807 (experimental grade) or mixtures thereof. Preferably, TBC is used. The plasticizer is generally used in amounts between 20 and 45 wt % based on the weight of the PLA.

The applicant found, unexpectedly, that by using a composition containing PLA and a mixture of Ecoflex® as agent for improving ductility, Lotader®AX8900 as chain modifier and TBC as plasticizer, using the amounts by weight of the various constituents based on the amount by weight of the polymer obtained from renewable resources (PLA), there was not only improvement of the properties of elongation at break, which was generally >200% with a Shore hardness A between 60 and 95 and a wettability expressed as a surface tension above 34 dyn/cm, but also of the properties of mould release, during which detachment of material was no longer observed.

The composition of the invention can also comprise additives for improving the surface finish of the mouldings. Finally the composition can also comprise fillers such as talc or other similar fillers without affecting the final properties of the moulded article or injection moulding.

The composition of the invention is particularly suitable for moulding by extrusion, injection or compression or by thermoforming, by usual moulding processes and with usual operating conditions of temperature and pressure.

The applicant found, unexpectedly, that if the composition notably comprised the plasticizer selected from tert-butylene citrate (tributyl citrate) and triethylene glycol di-2-ethylhexyl butyrate, the mouldings could be removed from the mould easily without any detachment of material.

The present invention also relates to a method of manufacturing the composition according to the invention, characterized in that the polylactide, the chain modifier, the elastomeric polymer and the plasticizer are mixed in the molten state.

The composition of the invention is generally obtained by mixing the various compounds included in the composition. It is generally carried out at a temperature between 160 and 190° C. Mixing can be carried out in a usual mixer, which can also be a static mixer or in an extruder. When mixing takes place in a mixer, all the compounds can be introduced simultaneously. If mixing is carried out in an extruder, the plasticizer is preferably introduced after the other compounds, when the latter are already in the molten state. After mixing, the composition according to the invention is preferably packaged in the form of granules.

The composition is then intended to be shaped by means of the usual plastics processing techniques, notably by moulding, by thermoforming or any other processing technique for producing articles. The present invention thus provides a method of manufacturing an article, characterized in that it consists of transforming the composition of the invention by moulding by extrusion, by injection, or by compression or by thermoforming.

The invention also relates to an article obtainable by the method of the invention. Among the latter, we may mention figurines.

EXAMPLES

In the examples according to the invention and the comparative examples, polylactide was used as rigid polymer obtained from renewable resources. More particularly, the poly-L-lactide identified below as PLA 4042 sold by NatureWorks having a number-average molecular weight of about 120 000 (PS equivalent) or the poly-L-lactide identified below as PLA 6201 sold by NatureWorks having a number-average molecular weight of about 100 000 (PS equivalent) was used.

As chain modifier, Lotader®AX8900 sold by the company Arkema France was used. Lotader®AX8900 comprises 68 wt % of ethylene, 24 wt % of methyl acrylate and 8 wt % of glycidyl methacrylate.

As elastomeric polymer for improving ductility, the poly(butylene adipate-co-terephthalate) sold by the company BASF under the name Ecoflex® F blend A1200 or NP EL 01 sold in Europe by the company NaturePlast was used.

As phthalate-free plasticizer, the triethylene glycol di-2-ethylhexyl butyrate supplied by Proviron under the name L807 (experimental grade) or the tributyl citrate (TBC) sold by Jungbunzlauer Landenburg GmbH under the trade name Citrofol® was used.

The results of the measurements for the examples according to the invention and for the comparative examples are given below in the various tables. The ASTM standards used for measuring the various properties are as follows:
- Shore hardness A and D: D-2240;
- Surface tension: D-2578;
- Tensile property (elongation at break): D-638;
- Storage modulus at 54° C.: D-4065;
- Impact test (ductility, total fracture energy and deflection): D-3763. The ductility index is expressed on the basis of the following formula ((Energy at rupture−Maximum energy)/Energy at rupture)×100.

Examples 1-2

PLA, either 4042 (example 1) or 6201, was placed in an internal mixer of the Brabender type, at a temperature of 190° C., at a speed of 40 revolutions per minute, for 15 minutes. First a mixture of PLA stabilizers was added (Ultranox 626 and Irganox 1024), and then an agent for improving ductility as well as a phthalate-free plasticizer were added, in the proportions shown in Table 1. TiO$_2$ was also added to the mixer as pigment and chain modifier (Lotader®AX8900).

A composition suitable for injection moulding was recovered from the mixer. This composition was injected into a mould for test specimens at a temperature of 190° C. and a pressure of 2 bar. This composition was held in the mould for 10 seconds. The test specimens were removed from the mould and the properties of the moulding were measured.

For all the articles moulded with the composition of the invention, no detachment of material during removal from the mould was observed.

For all the articles moulded with the composition of the invention, appearance of cracks was not observed, even after thermal treatment in the range from 20 to 160° C. for 45 minutes (heating at 3° C. per minute).

Example 1

The agent for improving ductility is Ecoflex® F blend A1200.
The plasticizer is L807.

Example 2

The agent for improving ductility is NP EL 01.
The plasticizer is TBC.
It is found that with these compositions, all of the principal desirable properties are obtained.

TABLE 1

|  |  | Examples | |
|---|---|---|---|
|  |  | 1 | 2 |
|  |  | References | |
|  |  | TC2 | TC6 |
| Composition (wt %) | PLA | 46 | 51 |
|  | Agent improving ductility | 23 | 18 |
|  | Talc |  |  |
|  | Plasticizer | 20 | 20 |
|  | Chain modifier | 10 | 10 |
|  | TiO$_2$ | 0.5 | 0.5 |
|  | Ultranox 626 | 0.25 | 0.25 |
|  | MID 1024 | 0.25 | 0.25 |
|  | Total | 100 | 100 |
| Properties |  |  |  |
| Hardness Shore A | Izod bars (4 mm) | 85 | 83 |
| Hardness Shore D | Izod bars (4 mm) | 49 | 40 |
| Surface | Surface tension (dyn/cm) | 36 | 36 |
| Tensile properties | Elongation at break (%) | 283 | 290 |
| Thermo-mechanical analysis | Storage modulus at 54° C. (MPa) | 73.4 | 42.5 |
| Impact test | Ductility index (%) | 46 | 33 |
|  | Total energy (J) | 10.2 | 9.6 |
|  | Deflection (mm) | 19 | 19 |

Examples 3 and 4

A composition with PLA that contains all the elements of the formulation allowing the main properties as well as the desirable properties to be achieved was prepared in a twin-screw mixer at a material temperature of 180° C.
The PLA is 4042.
The plasticizer is TBC.
The chain modifier is Lotader®AX8900.

Example 3

The agent for improving ductility is NP EL 01.

Example 4

The agent for improving ductility is a mixture of NP EL 01 and Ecoflex® F blend A1200.
Talc was added as an additional constituent in this example.
The results obtained are shown in Table 2.
It can be seen that with these compositions, all of the main and desirable properties are achieved.

TABLE 2

|  |  | Examples | |
|---|---|---|---|
|  |  | 3 | 4 |
|  |  | References | |
|  |  | TC13 | TC17 |
| Composition (wt %) | PLA | 50 | 53.2 |
|  | Agent for improving ductility |  |  |
|  | NL EL 01 | 20 | 10 |
|  | Ecoflex |  | 6.9 |
|  | Talc |  | 6.9 |
|  | Plasticizer | 19 | 12 |
|  | Chain modifier | 10 | 10 |
|  | TiO$_2$ | 0.5 | 0.5 |
|  | Ultranox 626 | 0.25 | 0.25 |
|  | MD 1024 | 0.25 | 0.25 |
|  | Total | 100 | 100 |

TABLE 2-continued

|  |  | Examples 3 References TC13 | Examples 4 References TC17 |
|---|---|---|---|
| Properties |  |  |  |
| Hardness Shore A | Izod bars (4 mm) | 93 | 94 |
| Hardness Shore D | Izod bars (4 mm) | 36 | 40 |
| Surface | Surface tension (dyn/cm) | 35 | 35 |
| Tensile properties | Elongation at break (%) | 203 | 207 |
| Thermo-mechanical analysis | Storage modulus at 54° C. (MPa) | 39 | 38 |
| Impact test | Ductility index (%) | 32 | 33 |
|  | Total energy (J) | 9 | 12.3 |
|  | Deflection (mm) | 20 | 19 |

Example 5 (Comparative)

A composition with PLA but not containing an agent for improving ductility was prepared as in examples 1 and 2.
The PLA is 6021.
The plasticizer is L807.
The chain modifier is Lotader®AX8900.

Example 6 (Comparative)

A composition with PLA but not containing an agent for improving ductility was prepared as in examples 1 and 2.
The PLA is 6021.
The plasticizer is TBC.
The chain modifier is Lotader®AX8900.

Example 7 (Comparative)

A composition with PLA but not containing a plasticizer was prepared in a twin-screw mixer at a material temperature of 180° C.
The PLA is 6021.
The agent for improving ductility is NP EL 01.
The chain modifier is Lotader®AX8900.

Example 8 (Comparative)

A composition with PLA but not containing a chain modifier was prepared in a twin-screw mixer at a material temperature of 180° C.
The PLA is 6021.
The agent for improving ductility is NP EL 01.
The plasticizer is TBC.

Example 9 (Comparative)

A composition with PLA that did not contain an agent for improving ductility was prepared in a twin-screw mixer at a material temperature of 180° C.
The PLA is 6021.
The plasticizer is TBC.
The chain modifier is Lotader®AX8900.

The results obtained for comparative examples 5 to 9 are presented in Table 3. For all the mouldings in comparative examples 5 to 9, appearance of cracks was not observed even after thermal treatment in the range from 20 to 160° C. in 45 minutes (heating at 3° C. per minute). It can be seen that none of the mouldings satisfies all the main, desirable properties.

TABLE 3

|  |  | Comparative examples 5 References TC1 | 6 References TC5 | 7 References TC10 | 8 References TC11 | 9 References TC12 |
|---|---|---|---|---|---|---|
| Composition (wt %) | PLA | 69 | 69 | 69 | 59 | 69 |
|  | Agent for improving ductility |  |  | 20 | 20 |  |
|  | Plasticizer | 20 | 20 |  | 20 | 20 |
|  | Chain modifier | 10 | 10 | 10 |  | 10 |
|  | TiO₂ | 0.5 | 0.5 | 0.5 | 0.5 | 0.5 |
|  | Ultranox 626 | 0.25 | 0.25 | 0.25 | 0.25 | 0.25 |
|  | MD 1024 | 0.25 | 0.25 | 0.25 | 0.25 | 0.25 |
|  | Total | 100 | 100 | 100 | 100 | 100 |
| Properties |  |  |  |  |  |  |
| Hardness Shore A | Izod bars (4 mm) | >95 | >95 | 99 | 92 | 94 |
| Hardness Shore D | Izod bars (4 mm) | 62 | 54 | 74 | 39 | 45 |
| Surface | Surface tension (dyn/cm) | 36 | 36 | 38 | 32 | 35 |
| Tensile properties | Elongation at break (%) | 253 | 250 | 253 | 258 | 190 |
| Thermo-mechanical analysis | Storage modulus at 54° C. (MPa) | 28.5 | 16.7 | 485 | 24 | 6.9 |
| Impact test | Ductility index (%) | 47 | 21 | 27 | 33 | 14 |
|  | Total energy (J) | 16 | 13.5 | 8.5 | 17.2 | 18 |
|  | Deflection (mm) | 20 | 19 | 16 | 22 | 22 |

Examples 10 and 11 (Comparative)

For comparison, the same test specimens were moulded in the same operating conditions but with two usual grades of PVC that are generally suitable for this type of injection moulding.

The results obtained are shown in Table 4.

For all the articles moulded from two grades of PVC, appearance of cracks was observed after thermal treatment in the range from 20 to 160° C. in 45 minutes (heating at 3° C. per minute).

It can be seen that the elongation at break is barely half what is obtained with the compositions of the invention.

TABLE 4

|  |  | Comparative examples | |
|---|---|---|---|
|  |  | 10 | 11 |
|  |  | References | |
|  |  | PVC 88 | PVC 92 |
| Properties |  |  |  |
| Shore hardness A | Izod bars (4 mm) | 86 | 91 |
| Shore hardness D | Izod bars (4 mm) | 40 | 48 |
| Surface | Surface tension (dyn/cm) | 32 | 32 |
| Tensile properties | Elongation at break (%) | 130 | 125 |
| TMA | Storage modulus at 54° C. (MPa) | 20.8 | 49.3 |
| Impact test | Ductility index (%) | 25 | 26 |
|  | Total energy (J) | 9.2 | 9.3 |
|  | Deflection (mm) | 17 | 18 |

What is claimed is:

1. A polymer composition comprising:
a) polylactide, and based on the weight of this polymer,
b) from 17 to 25 wt % of a chain modifier selected from copolymers and terpolymers comprising ethylene or styrene and an unsaturated monomer bearing at least one epoxide or carboxylic acid or carboxylic acid anhydride fraction and optionally a (meth)acrylate fraction,
c) from 30 to 55 wt % of an elastomeric polymer selected from biodegradable polyesters, aliphatic copolyesters, aromatic copolyesters and mixtures thereof and
d) from 20 to 45 wt % of a plasticizer.

2. The polymer composition according to claim 1, characterized in that the polylactide has a number-average molecular weight between 50,000 and 250,000.

3. The polymer composition according to claim 1, characterized in that the chain modifier is selected from copolymers and terpolymers comprising ethylene or styrene and an unsaturated monomer bearing a carboxylic acid anhydride fraction or bearing an epoxide fraction and a (meth)acrylate fraction.

4. The polymer composition according to claim 3, characterized in that the chain modifier is selected from copolymers of ethylene or of styrene and of glycidyl (meth)acrylate or maleic anhydride and terpolymers of ethylene or of styrene, of alkyl (meth)acrylate and of glycidyl (meth)acrylate or of maleic anhydride.

5. The polymer composition according to claim 4, characterized in that the chain modifier is selected from the copolymer of ethylene and of glycidyl methacrylate and the terpolymers of ethylene or of styrene, of alkyl acrylate and of glycidyl (meth)acrylate or of maleic anhydride.

6. The polymer composition according to claim 5, characterized in that the chain modifier is selected from the copolymer of ethylene and of glycidyl methacrylate and the terpolymers of ethylene or of styrene, of alkyl acrylate and of glycidyl methacrylate.

7. The polymer composition according to claim 6, characterized in that the elastomeric polymer is selected from poly(butylene adipate-co-terephthalate) and poly(butylene succinate-co-adipate).

8. The polymer composition according to claim 7, characterized in that the plasticizer is selected from the citrate esters, the butyrate esters and mixtures thereof.

9. A method of preparing a composition according to claim 8, characterized in that the polylactide, the chain modifier, the elastomeric polymer and the plasticizer are mixed in the molten state.

10. A method of manufacturing an article, characterized in that it consists of transforming the composition according to claim 8 by moulding by extrusion, by injection, or by compression or by thermoforming.

11. An article obtainable by the method according to claim 10.

12. The article according to claim 11, characterized in that the article is a figurine.

* * * * *